(12) United States Patent  (10) Patent No.: US 6,347,017 B1
Carlson  (45) Date of Patent: Feb. 12, 2002

(54) DISK STORAGE SYSTEM SERVO COMPENSATION FOR RUN-OUT ERROR

(75) Inventor: Lance Robert Carlson, Niwot, CO (US)

(73) Assignee: STMicroelectronics, N. V. (NL)

( * ) Notice: Subject to any disclaimer, the term of this patent is extended or adjusted under 35 U.S.C. 154(b) by 0 days.

(21) Appl. No.: 09/222,061

(22) Filed: Dec. 29, 1998

Related U.S. Application Data

(60) Provisional application No. 60/076,826, filed on Feb. 27, 1998.

(51) Int. Cl.$^7$ .............................................. G11B 5/596
(52) U.S. Cl. ................................. 360/77.04; 360/78.09
(58) Field of Search ................................ 360/78.04, 75, 360/77.04, 77.08, 78.09, 44.32

(56) References Cited

U.S. PATENT DOCUMENTS

| | | | |
|---|---|---|---|
| 5,592,346 A | * | 1/1997 | Sullivan ................... 360/77.04 |
| 5,608,586 A | * | 3/1997 | Sri-Jayantha et al. .... 360/77.04 |
| 5,886,846 A | * | 3/1999 | Pham et al. ............. 360/78.04 |
| 5,930,067 A | * | 7/1999 | Andrews et al. ......... 360/77.04 |
| 6,088,186 A | * | 7/2000 | Carlson ................... 360/77.04 |

* cited by examiner

Primary Examiner—David Hudspeth
Assistant Examiner—James L Habermehl
(74) Attorney, Agent, or Firm—Lisa K. Jorgenson; William J. Kubida

(57) ABSTRACT

The invention is a servo compensation method and system for use in a disk storage system. The disk storage system experiences error that causes a head to become mis-aligned with the disk. The error comprises multiple spin-frequency harmonic run-out error and other servo position errors. During follow mode, a digital filter processes a position error signal to generate a compensation signal. The position error signal is comprised of components representative of the multiple spin-frequency harmonic run-out error and the other servo position errors. The compensation signal is comprised of components that cause the servo positioning system to compensate for the multiple spin-frequency harmonic run-out error and the other servo position errors. The digital filter also operates as an oscillator that provides an oscillating signal at multiples of the spin frequency of the disk during seek mode.

30 Claims, 8 Drawing Sheets

DISK STORAGE SYSTEM SERVO COMPENSATION FOR RUN-OUT ERROR

RELATED APPLICATIONS

This application is related to U.S. Provisional Patent Application 60/076,826; filed on Feb. 27, 1998; and entitled "Runout Correction System."

FIELD OF THE INVENTION

The invention is related to the field of servo compensation for disk storage systems, and in particular, to a feedback control system that corrects spin-frequency harmonic run-out error and operates as an oscillator.

Problem

Disk storage systems store data in circular tracks on a disk that is typically a is magnetic disk or an optical disk. To read or write data to a magnetic disk, a servo positioning system positions a head over a track as the disk spins. Ideally, the servo positioning system would accurately position the head over the desired track, but disk storage systems experience servo position errors that cause a misalignment between the head and the track. Positioning occurs in two modes—seek and follow. In the seek mode, the head is moved from one track to a desired track. In the follow mode, the head remains positioned over the desired track.

Disk storage systems correct servo position errors using a servo compensation system. The servo compensation system uses a feedback control loop to monitor the past performance of a system and make on-going adjustments to correct errors. The feedback control loop has a position error detection system that generates a position error signal using information obtained in current and previous read operations of servo data. A typical position error detection system is comprised of the following components coupled in series: a head, an amplifier, a read channel, a servo demodulator, an analog to digital converter, and subtraction circuit. The feedback control loop has a servo compensation system that processes the position error to generate a servo compensation signal. A typical servo compensation system is a digital filter. The feedback control loop also has a servo positioning system that adjusts the position of the head based on the servo compensation signal. A typical servo positioning system is comprised of the following components coupled in series: a digital to analog converter, a voice coil motor amplifier, a voice coil motor, and a voice coil motor actuator.

A specific type of error, referred to herein as "spin-frequency harmonic run-out error", occurs when the disk or the circular tracks on the disk do not spin perfectly about the central axis of the disk. Spin-frequency harmonic run-out error has sinusoidal characteristics with associated harmonics because it tracks the spin of the disk. A large proportion of the spin-frequency harmonic run-out error is generated at the first harmonic of the spin frequency. However, spin-frequency harmonic run-out error is also generated at the second harmonic of twice the spin frequency and at additional harmonics. Spin-frequency harmonic run-out error generated at the second harmonic is especially problematic with removable disks, such as floppy disks, because of additional deformation in the floppy-type disk.

Some existing servo compensation systems are designed with a finite gain at the spin-frequency harmonic run-out error frequency and do not adequately eliminate spin-frequency harmonic run-out. Typical open-loop gain at the spin-frequency harmonic run-out error frequency is around 20 dB which is not enough to compensate for the spin-frequency harmonic run-out errors experienced by typical disk memory systems. Typical open-loop gain at the second spin-frequency harmonic run-out error frequency is around 10 dB which may not be enough to compensate for the second spin-frequency harmonic run-out errors experienced by typical disk memory systems. In addition, these systems are not specifically designed to compensate for spin-frequency harmonic run-out error at the second harmonic.

Existing spin-frequency harmonic run-out compensation systems are coupled to the primary servo compensation systems and are not integrated within the primary servo compensation systems. The two separate compensation systems require more hardware and can interfere with one another.

Some existing spin-frequency harmonic run-out compensation systems must be initialized when the system changes from the seek mode to the follow mode. System initialization is undesirable because it takes time for the resulting transient responses to die out and has significant consequences on system performance.

One existing spin-frequency harmonic run-out compensation system adds a feed-forward signal to the servo compensation signal. The feed-forward signal is not based on feedback, but is estimated based on previously measured spin-frequency harmonic run-out error. Estimating expected spin-frequency harmonic run-out error cancellation requires complex mathematical modeling that often allows some spin-frequency harmonic run-out error to remain. When the spin-frequency harmonic run-out error changes, overall system operation must be interrupted so the feed-forward signal can be re-calibrated. Additional hardware, firmware, computation time, and memory are required to generate the feed-forward signal.

A second existing spin-frequency harmonic run-out compensation system uses feedback to generate a separate spin-frequency harmonic run-out compensation signal that is added to the primary servo compensation signal. This spin-frequency harmonic run-out compensation system reduces spin-frequency harmonic run-out error, however, the second feedback loop formed by the spin-frequency harmonic run-out compensation system interferes with the performance of the primary the servo compensation system. In addition, the separate spin-frequency harmonic run-out compensation system requires additional hardware, firmware, computation time, and memory.

A third existing spin-frequency harmonic run-out compensation system processes the servo compensation signal with a bandpass filter. This spin-frequency harmonic run-out compensation system reduces spin-frequency harmonic run-out error, however, it does not eliminate spin-frequency harmonic run-out error because it does not have infinite gain at the spin frequency.

Existing spin-frequency harmonic run-out compensation systems must be added to the primary servo compensation system and are not integrated within the primary servo compensation system. Existing spin-frequency harmonic run-out compensation systems fail to specifically compensate for spin-frequency harmonic run-out error at the second harmonic. Some of these existing systems do not provide compensation during the seek mode and must be initialized at the beginning of each follow mode. For these reasons, there is a need for an integrated servo compensation system that eliminates spin-frequency harmonic run-out error at the first and second harmonics, and that operates during both the seek and follow modes to avoid initialization.

Solution

The invention overcomes the problems discussed above by providing an integrated servo compensation system for a disk storage system. The servo compensation system eliminates spin-frequency harmonic run-out error at the first harmonic during the follow mode, and in some examples of the invention, at multiples of the first harmonic. During the seek mode, the invention provides an oscillator at the spin frequency, and in some examples of the invention, at multiples of the spin frequency. The invention does not require initialization because it operates during both the seek and the follow modes.

The servo compensation system is comprised of a compensation means that processes a position error signal during follow mode. The position error signal is comprised of components representative of the spin-frequency harmonic run-out error and components representative of other servo position errors. The compensation means generates a compensation signal responsive to the position error signal. The compensation signal is comprised of components that cause the servo compensation system to compensate for the first and second harmonics of the spin-frequency harmonic run-out error and to compensate the other servo position errors. The servo compensation system also includes an oscillating means. The oscillating means generates an oscillating signal at the spin frequency of the disk, and in some examples of the invention, at multiples of the spin frequency. Since the spin frequency is equivalent to the spin-frequency harmonic run-out error frequency, the oscillating signal can be maintained to reduce spin-frequency harmonic run-out error at multiple harmonics during the seek mode.

The servo compensation system is based on a unique digital filter design. The design requirement combines solutions for first and second spin-frequency harmonic run-out error and other servo position errors into a single difference equation. The difference equation is solved to eliminate spin-frequency harmonic run-out error at the first and second harmonics by providing infinite gain at the spin frequency and twice the spin frequency. This design requirement requires application of the final value theorem, but before the final value theorem can be applied, new poles are added to offset existing poles caused by the sinusoidal spin-frequency harmonic run-out error. New zeros are then added near the new poles to stabilize the design.

The firmware implementation of the filter design uses an approach that departs from standard implementations. Compensation signals are generated for the proportional path, the differential path, the integral path, the spin frequency path, and the double spin frequency path. These signals are then summed to provide a single compensation signal. The firmware characteristics are then solved against the design requirements to finalize the filter design.

One advantage of the design is that both spin-frequency harmonic run-out error and other servo position errors are handled by a single compensation system. This results in less complexity and in the elimination of separate compensation systems. Another advantage of the design is that the compensation system can be operated as an oscillator during seek mode because of the additional poles. This feature avoids initialization during a mode switch. In addition, the design eliminates spin-frequency harmonic run-out error at both the first and second harmonics. The elimination of second spin-frequency harmonic run-out error is especially valuable with respect to floppy disk systems. Another advantage is that the compensator design can be easily extended to include run-out compensation at any number of higher harmonic frequencies simply by including additional parallel blocks in the compensator.

DETAILED DESCRIPTION

Figure 1:
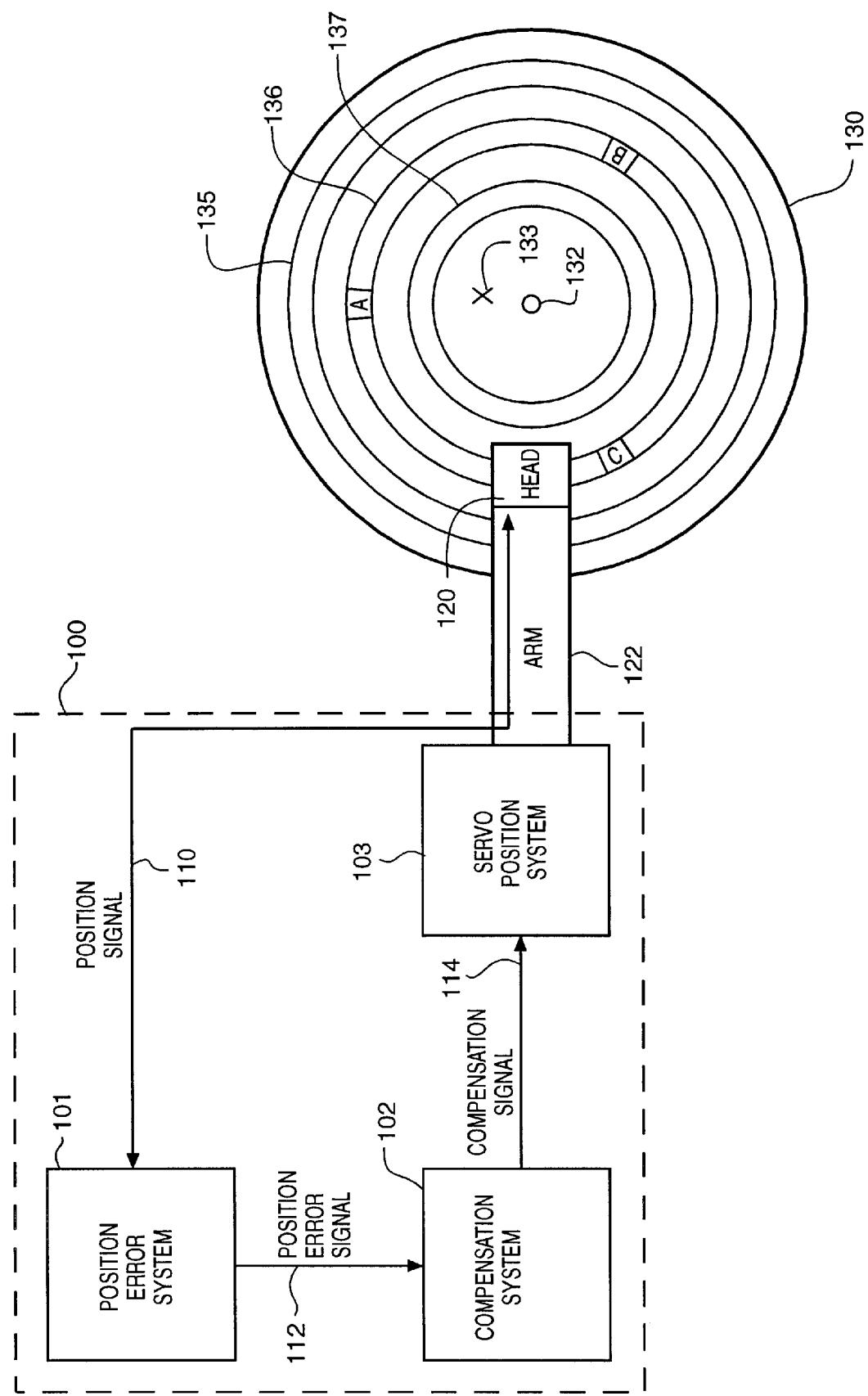
FIG. 1 is a block diagram of system architecture and operation for an example of the invention.

Disk Storage System and Operation—FIG. 1

FIG. 1 illustrates an example of an architecture for a disk storage system 100 in block diagram form. Disk storage system 100 includes a position error detection system 101, a compensation system 102, and a servo positioning system 103. The servo positioning system 103 is operationally connected to an arm 122 that is attached to a head 120 that is positioned over a disk 130. The disk 130 includes concentric tracks 135, 136, and 137 that store data. It should be noted that the invention is generally discussed in the context of magnetic disk systems, but that the invention applies equally to optical disk systems, or other similar disk systems. As a result, the head 120 represents any device that reads data from the disk or writes data to the disk. The head 120 could be a magnetic read/write head, an optical transducer, a laser, or any similar device.

The servo positioning system 103 positions the head 120 over the disk 130 to read or write data. The head 120 provides a position signal 110 to the position error detection system 101. The position signal 110 contains encoded position information typically implemented as many individual sets of position information equally spaced around the disk, three of which are depicted on FIG. 1 as A, B, and C. Each set is measured and converted into a single position error sample by the position error detection system 101. The position error detection system 101 amplifies and demodulates the position signal 110 to determine the actual position of the head 120 relative to the track. The position error detection system 101 compares the actual position of the head 120 to the desired position of head 120 to determine position error. The position error detection system 101 provides a position error signal 112 to the compensation system 102.

Disk storage systems operate in two modes—seek and follow. In the seek mode, the servo positioning system 103 moves the head 120 to a new track. For example, the servo positioning system 103 causes the head 120 to leave track 136 and seek to track 137. In the follow mode, the servo positioning system 103 causes the head 120 to follow the track currently under the head 120. For example, the servo positioning system 103 causes the head 120 to remain positioned over track 137.

Disk storage systems experience position errors where the head 120 becomes mis-aligned with the disk 130. For example, it may be desired to position the head 120 over track 136, but due to position error, the head 120 may actually be positioned over, or partially over, track 135. This could prevent the head 120 from reading data from track 136. This could also result in the head 120 writing data to track 135 instead of track 136, and corrupting the existing data in track 135. Tracks 135–137 are depicted on FIG. 1 for illustrative purposes, but those skilled in the art appreciate that many more tracks can be contained on a disk. In addition, the width of the tracks and the distance between tracks is typically very small. On some disks, the width of a track is four micro-meters and the distance between tracks is one micro-meter.

Ideally, the disk 130 would spin about its central axis 132. This causes the circular track 136 to consistently spin under the head 120. Spin-frequency harmonic run-out error is a type of position error that can occur when the disk 130 does not spin about its central axis. For example, if the disk 130 were to spin about the spin axis 133, the head 120 would not remain positioned over track 136 as the disk 130 spins. Instead, tracks 135 or 137 may appear under the head 120. The position error signal 112 is comprised of components representative of both spin-frequency harmonic run-out error and other servo position errors. The compensation system 102 compensates for both spin-frequency harmonic run-out error and other servo position errors by causing the servo position system 103 to continually move the head 120 so it remains positioned over the appropriate track.

The compensation system 102 is comprised of a digital filter that is designed in accord with the present invention and discussed in detail below. In the follow mode, the compensation system 102 provides a compensation signal 114 to the servo positioning system 103. The compensation signal 114 is comprised of components that cause the servo positioning system 103 to compensate for the spin-frequency harmonic run-out error and the other servo position errors. In some examples of the invention, the compensation system 102 generates the compensation signal 114 to compensate for spin-frequency harmonic run-out error at multiple harmonics. In the seek mode, the compensation system 102 provides a compensation signal 114 to the servo positioning system 103. In the seek mode, the compensation signal is comprised of components that cause the servo positioning system to move the head to a destination track, and also oscillating components which are used to reduce spin-frequency harmonic run-out error in the seek mode. The oscillating component of the compensation signal 114 is at the spin frequency of the disk device, and in some examples of the invention, the compensation signal 114 includes oscillating components at multiples of the spin frequency.

An example of system operation is provided below, but the invention is not restricted to this example. The example begins with the disk storage system in the follow mode and the head 120 positioned over track 136. Due to servo position error and spin-frequency harmonic run-out error, the head 120 becomes mis-aligned with track 136 as the disk 130 spins. The head 120 reads position information from servo data fields A, B, and C that are spaced at intervals in track 136 on the disk 130. These readings generate position information samples at a rate based on the spin frequency of the disk 130 and the total number of servo data fields that are read in each revolution. These readings provide position information that indicates the actual position of the head 120 relative to track 136 on the disk 130. The position information is incorporated into the position signal 110 and provided to the position error detection system 101. The position error detection system 101 amplifies and demodulates the position signal 101 before converting it to a digital signal. The position error detection system 101 then subtracts the position information contained in the position signal 110 from the desired position to obtain the position error. The position error is incorporated into the position error signal 112.

The compensation system 102 processes the position error signal 112 and generates the compensation signal 114. The compensation signal 114 is comprised of components that will cause the servo positioning system 103 to compensate for the spin-frequency harmonic run-out error and the other servo position errors. The compensation signal 114 is provided to the servo positioning system 103 where it is converted to an analog signal and amplified. The servo positioning system 103 then applies the compensation signal 114 to the voice coil motor actuator causing the voice coil motor to move the head 120. This movement compensates for the spin-frequency harmonic run-out error and the other servo position errors by attempting to re-position the head 120 exactly over track 136.

If a seek is attempted from track 136 to track 137, the position error signal 112 represents the error between the current location of the head the desired destination location of the head, so the compensation system 102 generates the compensation signal 114 which causes the servo positioning system 103 to re-position the head over the destination track. The servo positioning system 103 uses the oscillation components of the compensation signal 114 as a feed forward signal to reduce spin-frequency harmonic run-out error during seek mode.

Figure 2:
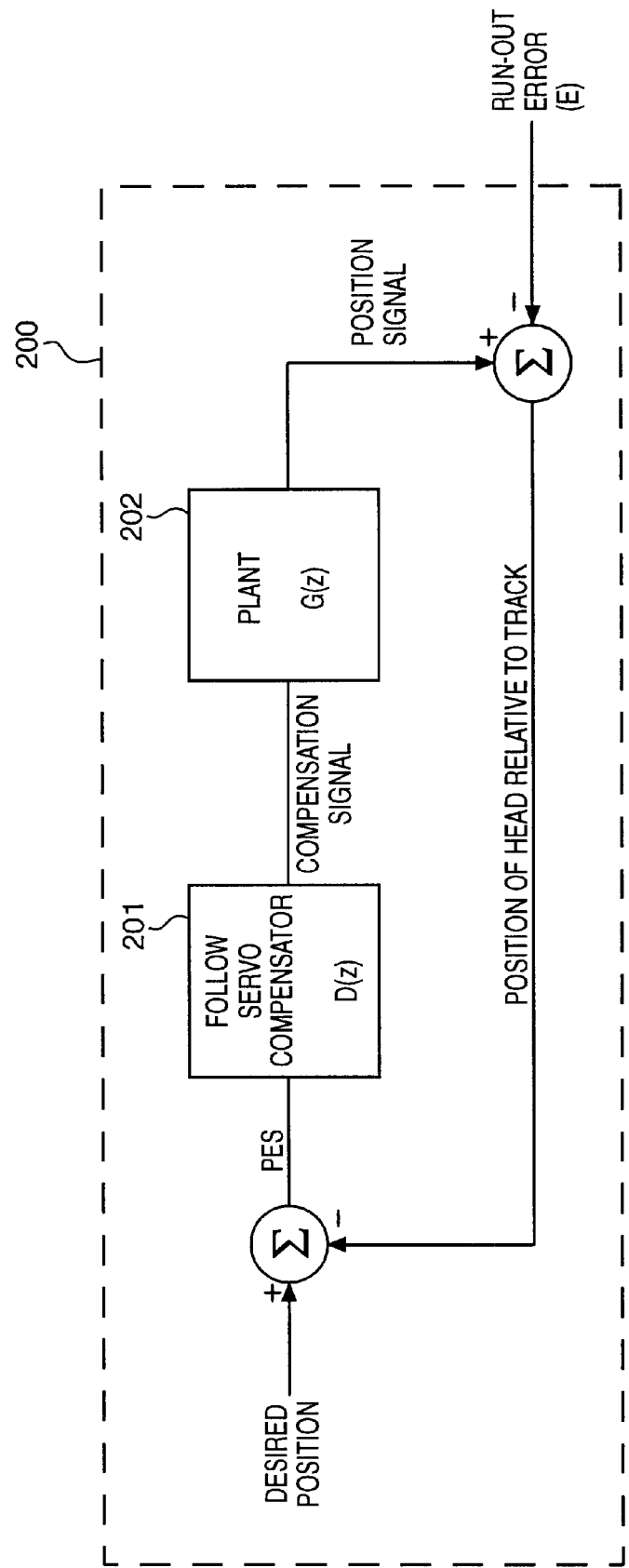
FIG. 2 is a block diagram of a feedback control loop for an example of the invention.

Compensation System—FIG. 2

The invention is first discussed below in terms of a system to handle first spin-frequency harmonic run-out, and second, the invention is discussed in terms of a system to handle multiple spin-frequency harmonic run-out. The numbered subscripts refer to the associated harmonics of spin-frequency harmonic run-out error. For example, subscript 1 refers to the first harmonic, subscript 2 refers to the second harmonic, and subscript N refers to the Nth harmonic.

FIG. 2 depicts a block diagram of the feedback control loop 200 for an example of the invention. Starting at the left, the position of the head relative to the disk is subtracted from the desired position to obtain the position error signal—PES. The position error signal is provided to the servo compensator D(z) 201. The follow servo compensator 201 provides compensation signal to the plant G(z) 202. The plant 202 represents gain from components that are external to the servo compensator 201, such as digital-to-analog converters, amplifiers, VCM actuators, head widths, track pitch, and read channel and also represents the means to read the position data from the disk and convert it into a position signal. At the right, the spin-frequency harmonic run-out error (E) is subtracted from the position signal to obtain the position of the head relative to the disk in the presence of spin-frequency harmonic run-out. This completes the feedback control loop.

The design of the follow servo compensator 201 uses the well known Z transform representation. The goal is to find a D(z), which is the Z-transform transfer function for the follow servo compensator 201, with position error signal equal to zero despite spin-frequency harmonic run-out error. By applying the well-known final value theorem, a steady state filter design can be derived that eliminates spin-frequency harmonic run-out error. From the block diagram of FIG. 2, the Z transform of the position error signal is:

$$PES(z) = \frac{1}{1 + D(z)G(z)} \cdot E(z)$$

E(z) is the Z-transform of a sinusoid at the spin frequency for first spin-frequency harmonic run-out:

$$E_1(z) = \frac{z(z - \cos\omega T)}{(z - e^{j\omega T})(z - e^{-j\omega T})}$$

In the above equation, $E_1(z)$ has poles on the Z-plane unit circle that prevent application of the final value theorem to position error signal(z). These poles can be offset by adding poles to D(z) which are at the same locations on the unit circle as those in $E_{1\ (z)}$:

$$z = e^{\pm j\omega T}$$

In addition to providing cancellation for the $E_1(z)$ poles, these additional poles in D(z) can generate an oscillation signal if D(z) is operated in the seek mode because the poles are located precisely on the unit circle. The oscillating behavior of D(z) represents a distinct advance in the art because D(z) operates to reduce spin-frequency harmonic run-out error in both the seek and follow mode, and as a result, D(z) does not require initialization when the follow mode is entered after a seek.

The Z-plane unit circle is the stability boundary for the poles in the system. The additional poles on the unit circle make the filter unstable, so zeros are added near the additional poles at:

$$z = a_1 e^{\pm j\omega T}$$

where $a_1$ is typically between 0.95 and 0.995 with a preferred value of 0.98. A larger value for $a_1$ results in: 1) less degradation in the control loop gain/phase margin, 2) a phase that is stable over a greater frequency range, and 3) longer settling time for correction of run-out errors from a random starting condition of the compensator.

The design requirement for D(z) for first spin-frequency harmonic run-out becomes:

$$D_1(z) = K_p\left(1 + K_d \frac{(z-1)}{z} + K_i \frac{z}{z-1}\right)\left(\frac{(z - a_1 e^{j\omega T})(z - a_1 e^{-j\omega T})}{(z - e^{j\omega T})(z - e^{-j\omega T})}\right)$$

where:

$K_p$=the scaling coefficient set for 0 db gain at desired Bode crossover frequency $$K_d = \frac{1}{T \cdot 2\pi f_d}$$

$K_i = T \cdot 2\pi f_i$ $f_d$=desired corner frequency for differentiator portion of D(z)

$f_i$=desired corner frequency for integrator portion of D(z); typically $f_d = f_i$ $f_{spin}$=spin frequency $\omega = 2\pi f_{spin}$ $$T = \frac{1}{f_{spin} \cdot \text{number of servo position samples per rotation of the disk}}$$

In the above equation for $D_1(z)$, the second bracketed term represents the correction for spin-frequency harmonic run-out error at the first harmonic. The first bracketed term and $K_p$ represent the correction for the other servo position errors. $D_1(z)$ has infinite gain at the spin frequency so it completely eliminates spin-frequency harmonic run-out error at the spin frequency. Well known root locus or Bode analysis techniques may be used to demonstrate that a given set of the above-listed design values produces a stable servo design.

The compensation for the other servo position errors has zeros for the integrator and differentiator corner frequencies. These corner frequencies are typically chosen to be the same frequency and are located between the spin frequency and the desired 0 db open-loop crossover frequency. This design produces a good trade off between high gain at the spin frequency to better correct spin-frequency harmonic run-out error and good phase margin for stable servo operation. The present compensation system can be further improved by lowering the frequency of these zeros. This does not affect the gain at the spin frequency because it is now infinite, but it does add phase/gain margin for more stable servo operation.

Poles are well known to those familiar with digital filter design. Poles represent points where the denominator is zero in an equation characterizing the response of a digital filter. The spin frequency path of $D_1(z)$ contains poles on the unit circle which means that, upon absence of any input, $D_1(z)$ behaves as an oscillator at a frequency corresponding to the pole locations. The pole locations correspond to the spin frequency. Thus, $D_1(z)$ provides an oscillating signal at the spin frequency when it is first operated in the follow mode for a time period and is then operated in the seek mode independently of the feedback control loop with an input value forced to zero.

The oscillation signal is the same as the frequency of the spin-frequency harmonic run-out error and has correct phase and amplitude to exactly cancel the spin-frequency harmonic run-out error since it was operated previously in the follow mode where the spin frequency path of $D_1(z)$ adapts to produce the correct phase and amplitude for canceling the spin-frequency harmonic run-out error. As a result, the oscillating signal can be used to cancel spin-frequency harmonic run-out error in the seek mode. If $D_1(z)$ has reached a steady state during the follow mode, then $D_1(z)$ was completely canceling out the spin-frequency harmonic run-out error and should continue to do so in the seek mode.

Figure 3:
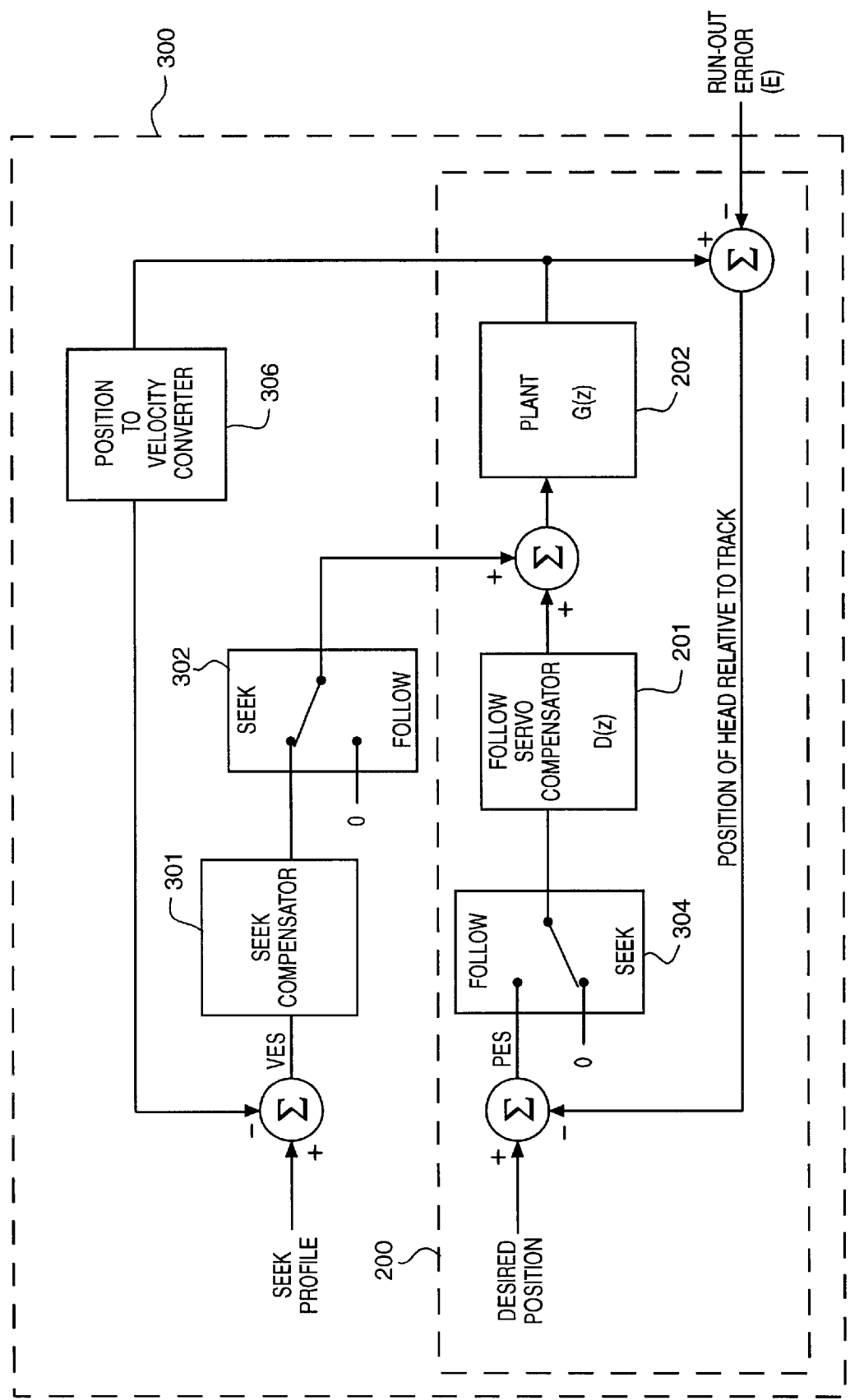
FIG. 3 is a block diagram of a mode switch-over feedback control loop for an example of the invention.

Seek to Follow Mode Switch-Over—FIG. 3

FIG. 3 depicts a block diagram of a mode switch-over feedback control loop 300 for an example of the invention. The mode switch-over feedback control loop 300 is comprised of the of feedback control loop 200 of FIG. 2 including the following modifications. A switch 304 is added before the follow servo compensator 201. A seek compensator 301, switch 302, and position-to-velocity converter 306 are added as a seek mode compensation feedback loop. In the follow mode, the switches 502 and 504 switch-over to the follow leads, and the system then operates the same as discussed for FIG. 2.

In the seek mode, the switch 302 switches over to pass a seek compensation signal from the seek compensator 301, and the switch 304 switches over to set the input to the follow servo compensator 201 to zero. With position error signal equal to zero, the output of the follow servo compensator 201 is an oscillating signal at the spin frequency. The oscillating signal is combined with the seek compensation signal from the switch 302 and is provided to the plant 202. The feedback signal from the plant 202 is converted into a velocity measurement by the position-to-velocity converter 306. The velocity measurement is subtracted from the seek profile and provided to the seek compensator 301 as a Velocity Error Signal (VES) to complete the loop.

Existing compensation systems for the follow mode are inoperative during the seek mode and must be initialized at the beginning of each follow mode. Initialization of any spin-frequency harmonic run-out portion of a compensator, such as a bandpass filter, requires an undesirable time delay for transient responses in the compensator to settle out. Advantageously, the follow servo compensator 201 remains operational in is both the follow mode and the seek mode and does not require time-consuming initialization when switching from the seek mode to the follow mode.

Figure 4:
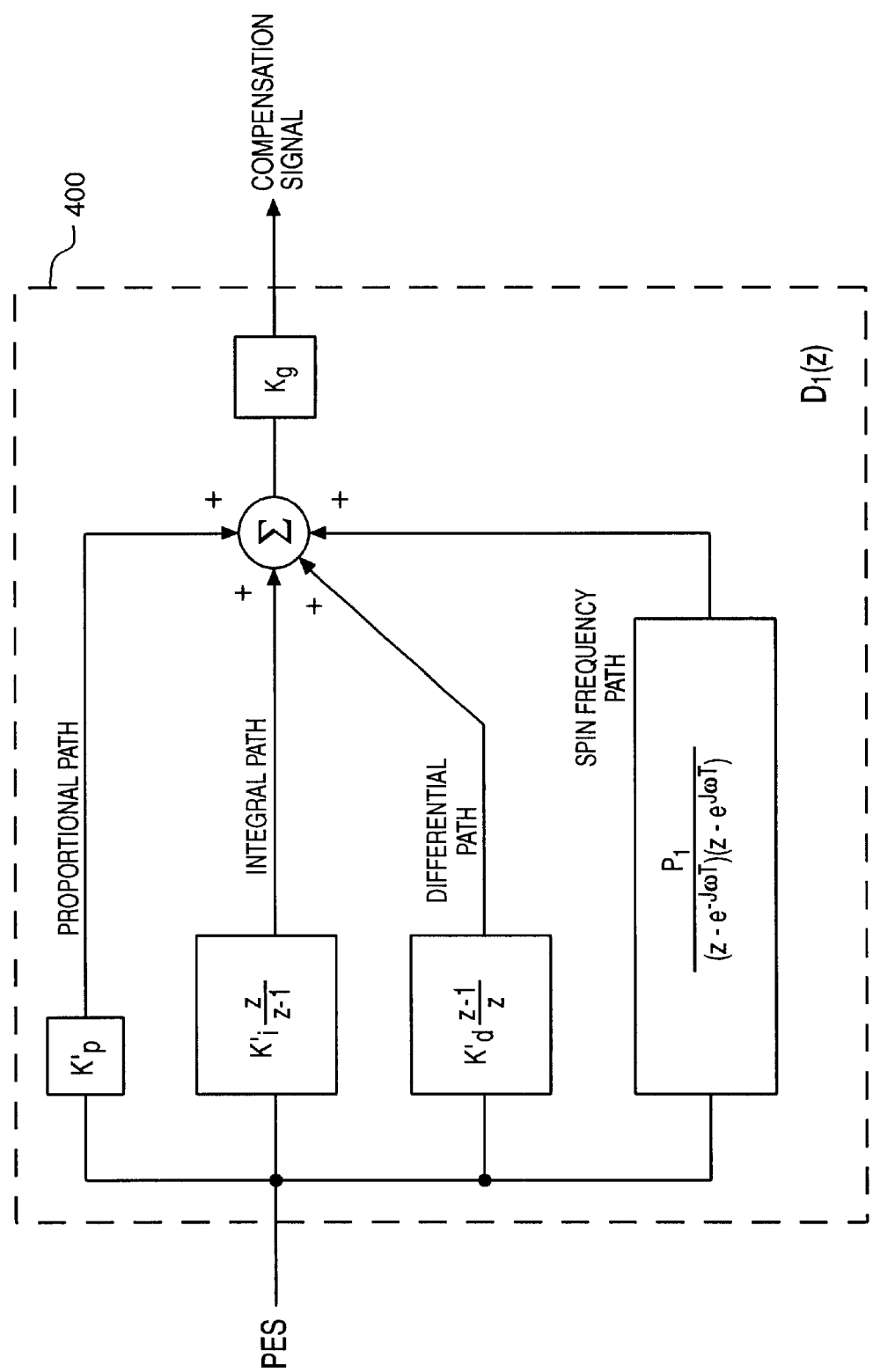
FIG. 4 is a block diagram of a digital filter design for an example of the invention.
Figure 5:
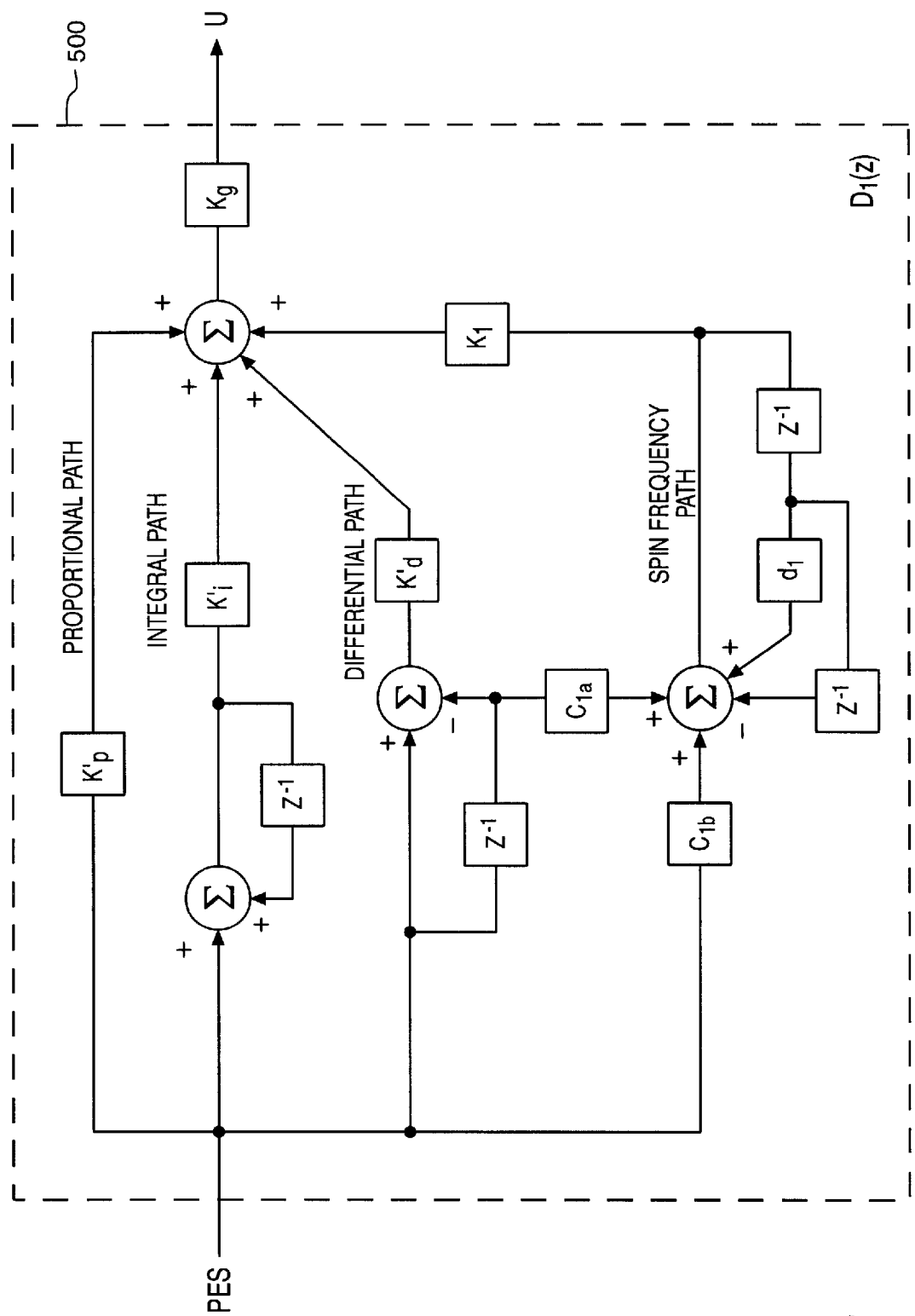
FIG. 5 is a block diagram of a digital filter implementation for an example of the invention.
Figure 6:
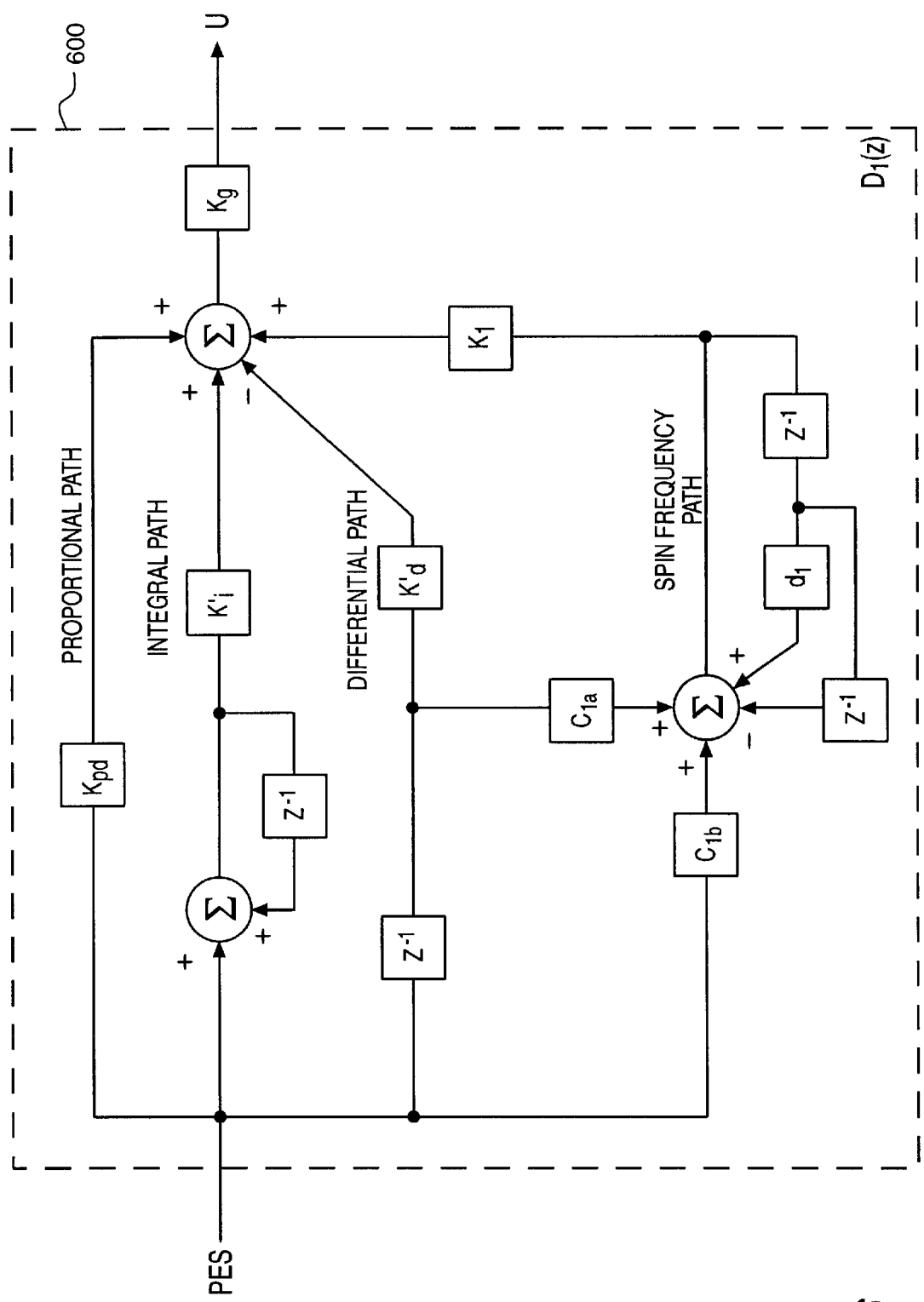
FIG. 6 is a block diagram of a digital filter implementation for an example of the invention.

Compensator Design for First Spin-frequency harmonic run-out—FIGS. 4–6

FIG. 4 depicts a block diagram of a firmware implementation 400 for $D_1(z)$ in an example of the invention designed to compensate for first spin-frequency harmonic run-out. Conventional compensation techniques separate the spin-frequency harmonic run-out error compensation system from the servo compensation system. This means that the proportional path, the integral path, and the differential path for servo compensation are placed in one block, and the spin frequency path for the spin-frequency harmonic run-out compensation is placed in a completely separate block. In a distinct advance in the art, the invention places the spin frequency path in the same block with the other servo compensation paths, and thus, an entire block that includes both spin-frequency harmonic run-out compensation and servo compensation can be solved by a single difference equation. In the firmware implementation 400, the proportional path, integral path, differential path, and spin frequency path are all placed in parallel. Those skilled in the art will appreciate that the proportional path, integral path, and differential path could take other forms without departing from the invention.

A polynomial $P_1$ has been added to the numerator of the spin frequency path so the $D_1(z)$ for the firmware implementation 400 can be solved against the design requirement represented by the above equation for $D_1(z)$. Based on standard block diagram analysis, the $D_1(z)$ of the firmware implementation 400 is:

$$D_1(z) = K_g\left(K'_p + K'_d \frac{z-1}{z} + K'_i \frac{z}{z-1} + \frac{P_1}{(z-e^{j\omega T})(z-e^{-j\omega T})}\right)$$

where:
$K_g$=scaling coefficient for 0 db gainat desired Bode crossover frequency
$K'_p$ is obtained by solution of $D_{1F}(z)$ and is related to $K_p$
$K'_d$ is obtained by solution of $D_{1F}(z)$ and is related to $K_d$
$K'_i$ is obtained by solution of $D_{1F}(z)$ and is related to $K_i$
$P_1$=general second order polynomial $c_{1a}z^2+c_{1b}z+c_{1c}$ By equating the two $D_1(z)$ equations given above—one for the design requirement and one for the firmware implementation 400—the following variables can be determined: $K_g$, $K'_p$, $K'_d$, $K'_i$, $c_{1a}$, $c_{1b}$, and $c_{1c}$. The solution has five equations and six variables, so the $c_{1c}$ variable can be eliminated. This represents a significant reduction in the firmware complexity. One filter state variable and one filter coefficient are eliminated. This is only possible because the solution for spin-frequency harmonic run-out error and the solution for the other servo position errors are combined into a single compensator block, and thus, they can be solved by the same difference equation. Those skilled in the art are familiar with the technique to solve $D_1(z)$ for the above variables, and the solution is omitted for brevity.

FIG. 5 depicts block diagram of a firmware structure 500 for the above solution of $D_1(z)$ in an example of the invention. The diagram uses $z^{-1}$ to represent a time delay of one sample and where $d_1$ is related to the spin frequency and sample rate and is equal to 2 cosine ($\omega T$). The spin frequency path including the $c_{1a}$ and $c_{1b}$ variables represent the spin-frequency harmonic run-out compensation and the other paths represent compensation for the other servo position errors. $K_1$ represents an additional scaling gain for the spin frequency path and is set to scale the signal levels internal to the spin frequency path so as to minimize numerical computation errors such as integer truncation. The firmware structure 500 completely eliminates first-spin-frequency harmonic run-out error at steady state and also corrects the other servo position errors in a relatively simple and compact design.

During seek mode, only the spin frequency path needs to run to provide the oscillation signal. Since the signals through $c_{1a}$ and $c_{1b}$ are zero during the seek mode, only the remainder of the spin frequency path needs to run to provide the oscillation signal if desired. Equivalently, only the portion of the difference equation for $D_1(z)$ related to the spin frequency path needs to be computed.

FIG. 6 depicts block diagram of an alternative firmware structure 600 for the above solution of $D_1(z)$ in an example of the invention. Note that $K_{pd}$ has replaced $K_p$ in the proportional path where $K_{pd}=K_p+K_d$. The differential path is correspondingly simplified by the elimination of the summation block.

Figure 7:
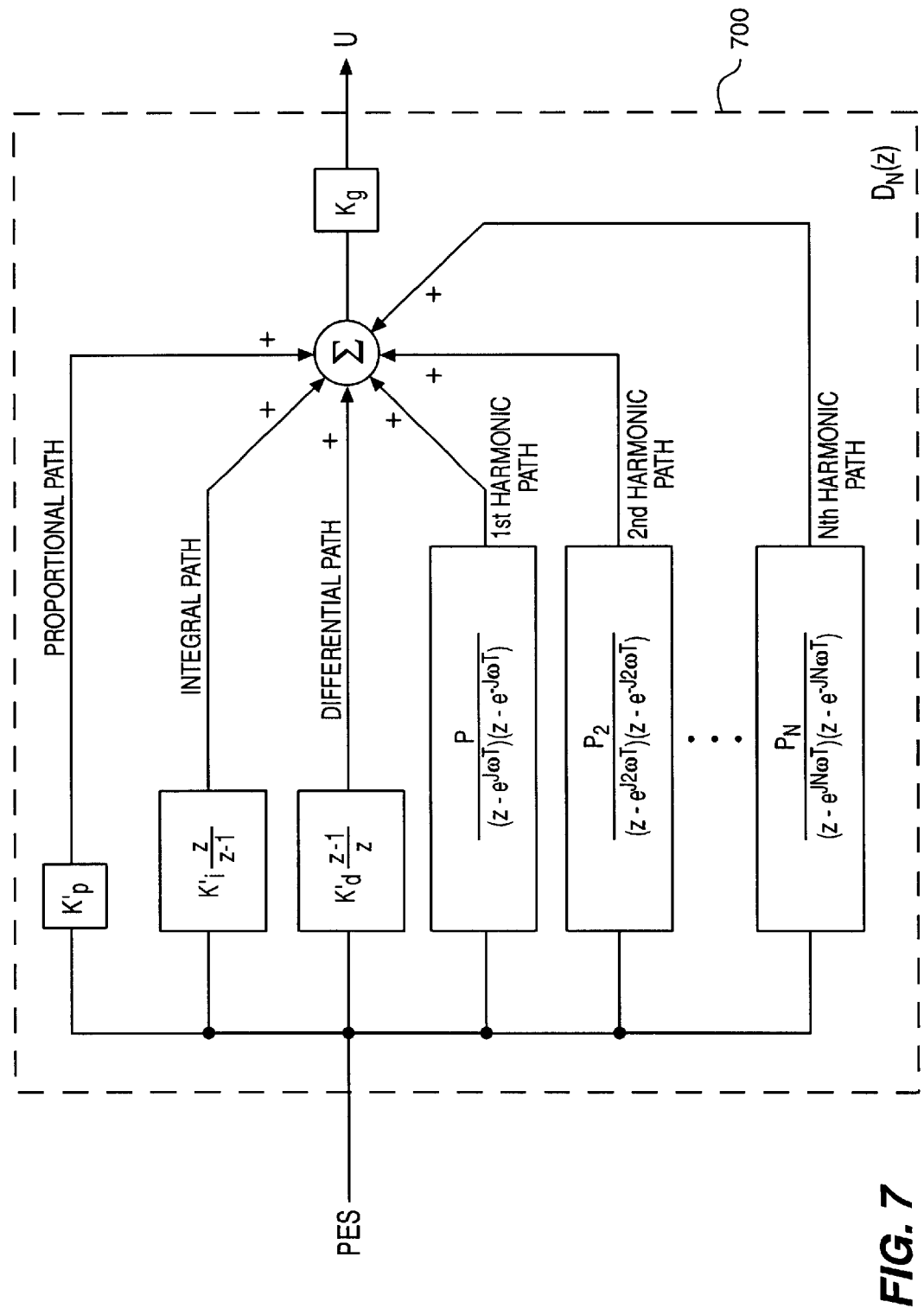
FIG. 7 is a block diagram of a digital filter design for an example of the invention.
Figure 8:
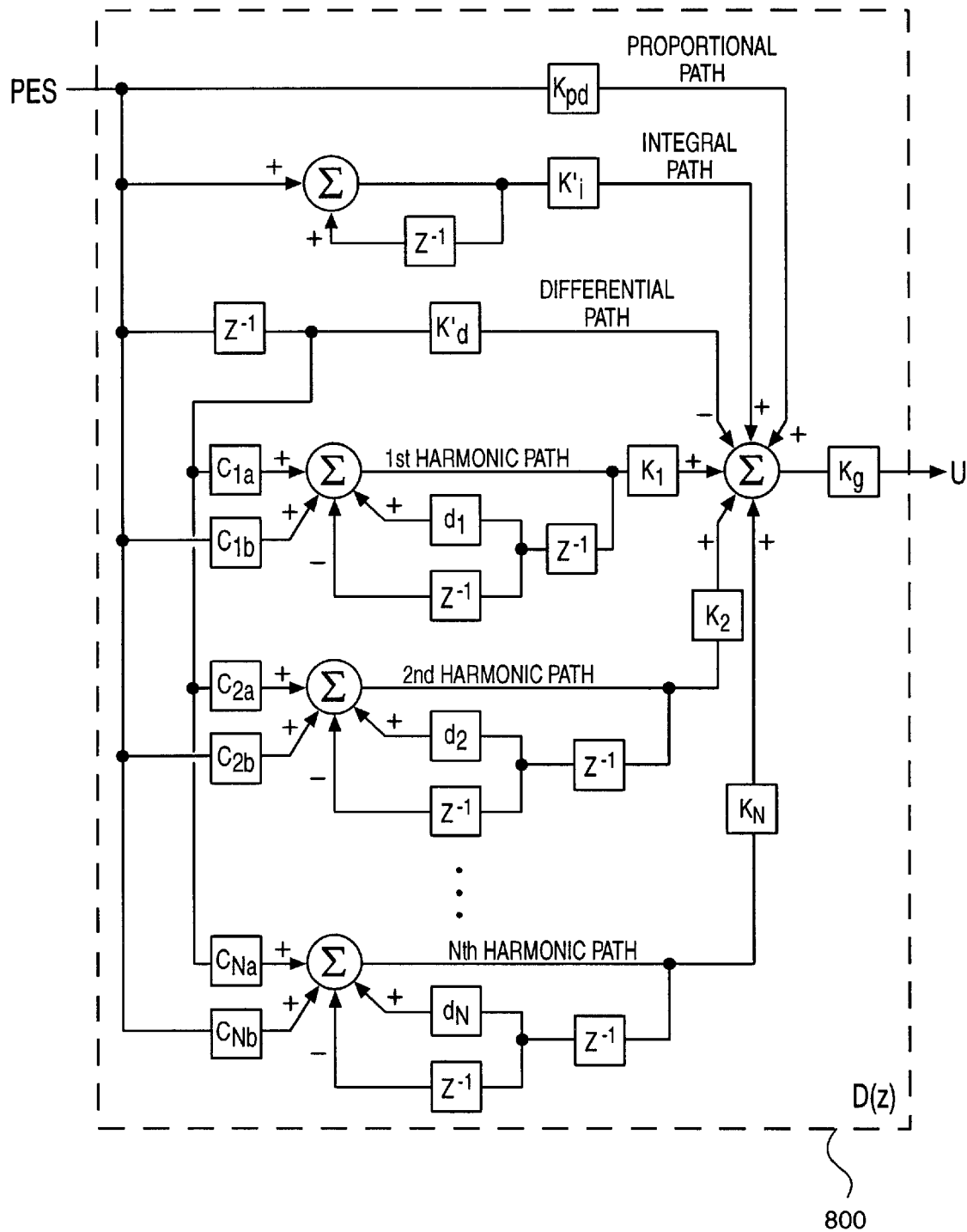
FIG. 8 is a block diagram of a digital filter implementation for an example of the invention.

Compensator Design for Multiple Spin-frequency harmonic run-out—FIGS. 7–8

The design requirement for $D_N(z)$ to compensate for multiple spin-frequency harmonic run-out errors is:

$$D_N(z) = K_p\left(1 + K_d \frac{(z-1)}{z} + K_i \frac{z}{z-1}\right)\left(\frac{(z-a_1 e^{j\omega T})(z-a_1 e^{-j\omega T})}{(z-e^{j\omega T})(z-e^{-j\omega T})}\right)$$

$$\left(\frac{(z-a_2 e^{j2\omega T})(z-a_2 e^{-j2\omega T})}{(z-e^{j2\omega T})(z-e^{-j2\omega T})}\right) \cdots \left(\frac{(z-a_N e^{jN\omega T})(z-a_N e^{-jN\omega T})}{(z-e^{jN\omega T})(z-e^{-jN\omega T})}\right)$$

Those skilled in the art will appreciate the necessary terms to add at the dotted line to obtain spin-frequency harmonic run-out compensation to the Nth harmonic. Note that it is not necessary to include all harmonics between 1 and N, for example, one might choose to implement only the 1, 2, 3, and 6 harmonics. The terms $a_2$ and $a_N$ are for the cancellation zeroes at additional harmonics are typically values between 0.95 and 0.99. FIG. 7 depicts a block diagram for in an example of the invention designed to compensate for multiple spin-frequency harmonic run-out. The equation for $D_N(z)$ of the firmware implementation 700 is:

$$D_N(z) = K_g \left( \begin{array}{c} K'_p + K'_d \dfrac{z-1}{z} + K'_i \dfrac{z}{z-1} + \dfrac{P_1}{(z-e^{j\omega T})(z-e^{-j\omega T})} + \\ \dfrac{P_2}{(z-e^{j2\omega T})(z-e^{-j2\omega T})} + \cdots + \dfrac{P_N}{(z-e^{jN\omega T})(z-e^{-jN\omega T})} \end{array} \right)$$

where:

$P_2$=general second order polynomial $c_{2a}z^2 + c_{2b}z$ $P_N$=general second order polynomial $c_{Na}z^2 + c_{Nb}z$ Those skilled in the art will appreciate the necessary terms to add at the dotted line to obtain spin-frequency harmonic run-out compensation to the Nth harmonic. By equating the two $D_N(z)$ equations given above—one for the design requirement and one for the firmware implementation 700—the variables can be determined. Those skilled in the art are familiar with the technique to solve $D_N(z)$ for the above variables, and the solution is omitted for brevity.

FIG. 8 depicts block diagram of a firmware structure 800 for the above solution of $D_N(z)$ in an example of the invention. The terms $d_2$ and $d_N$ are equal to 2 cosine $(2\omega T)$ and 2 cosine $(N\omega T)$ respectively. $K_2$ and $K_N$ represent additional scaling gains for the respective harmonic paths and are set to scale the internal signal levels for the respective harmonic paths to minimize numerical computation errors such as integer truncation. The firmware structure 800 completely eliminates spin-frequency harmonic run-out error at multiple harmonics of the spin frequency at steady state during the follow mode and provides an oscillation signal at multiple harmonics of the spin frequency during the seek mode.

On FIG. 8, the following paths are placed in parallel: proportional path, integral path, differential path, first spin-frequency harmonic run-out path, second spin-frequency harmonic run-out path, and Nth spin-frequency harmonic run-out path. The outputs from these paths—from variables $K_{pd}$, $K'_i$, $K'_d$, $K_1$, $K_2$, and $K_N$—are summed, and the sum is multiplied by the variable $K_g$ to generate the signal U.

The proportional path multiplies the position error signal by the variable $K_{pd}$. The integral path provides the position error signal to an integral path summation block. The integral path multiplies the summation result by the variable $K'_i$ and is also delays the summation result by one sample and provides it back to the integral path summation block. The differential path delays the position error signal by one sample and multiplies the delayed the variable $K'_d$.

The first spin-frequency harmonic run-out path delays the position error signal by one sample, multiplies the delayed the position error signal by the variable $c_{1a}$, and provides the result to a first spin-frequency harmonic run-out path summation block. The first spin-frequency harmonic run-out path multiplies the position error signal by the variable $c_{1b}$ and provides the result to the first spin-frequency harmonic run-out path summation block. The first spin-frequency harmonic run-out path multiplies the summation result from the first spin-frequency harmonic run-out path summation block by the variable $K_1$. The first spin-frequency harmonic run-out path also delays the summation result by one sample, multiplies the delayed summation result by the variable $d_1$, and provides this result back to the first spin-frequency harmonic run-out path summation block. The first spin-frequency harmonic run-out path also delays the summation result by two samples and provides this result back to the first spin-frequency harmonic run-out path summation block as a value which is subtracted.

The second spin-frequency harmonic run-out path delays the position error signal by one sample, multiplies the delayed the position error signal by the variable $c_{2a}$, and provides the result to a second spin-frequency harmonic run-out path summation block. The second spin-frequency harmonic run-out path multiplies the position error signal by the variable $c_{2b}$, and provides the result to the second spin-frequency harmonic run-out path summation block. The second spin-frequency harmonic run-out path multiplies the summation result from the second spin-frequency harmonic run-out path summation block by the variable $K_2$. The second spin-frequency harmonic run-out path also delays the summation result by one sample, multiplies the delayed summation result by the variable $d_2$, and provides the result back to the second spin-frequency harmonic run-out path summation block. The second spin-frequency harmonic run-out path also delays the summation result by two samples and provides the result back to the second spin-frequency harmonic run-out path summation block as a value which is subtracted.

The Nth spin-frequency harmonic run-out path delays the position error signal by one sample, multiplies the delayed the position error signal by the variable $c_{Na}$, and provides the result to an Nth spin-frequency harmonic run-out path summation block. The Nth spin-frequency harmonic run-out path multiplies the position error signal by the variable $c_{Nb}$ and provides the result to the Nth spin-frequency harmonic run-out path summation block. The Nth spin-frequency harmonic run-out path multiplies the summation result from the Nth spin-frequency harmonic run-out path summation block by the variable $K_N$. The Nth spin-frequency harmonic run-out path also delays the summation result by one sample, multiplies the delayed summation result by the variable $d_N$, and provides the result back to the Nth spin-frequency harmonic run-out path summation block. The Nth spin-frequency harmonic run-out path also delays the summation result by two samples and provides the result back to the Nth spin-frequency harmonic run-out path summation block as a value which is subtracted.

CONCLUSION

The invention is an integrated servo compensation system that corrects both spin-frequency harmonic run-out error and other servo position errors in the follow mode. The invention is operated as an oscillator during seek mode to cancel spin-frequency harmonic run-out error. Continuous operation eliminates the initialization period required by existing systems. Examples of the invention have been described to address spin-frequency harmonic run-out at multiple harmonics.

The invention has been described in the context of magnetic disk systems, but it is also readily applicable to optical disk systems or other similar disc systems. Those skilled in the art will appreciate how to apply the invention to optical disk systems or to other similar disk systems.

Those skilled in the art can appreciate variations of the above-described embodiments that fall within the scope of the invention. As a result, the invention is not limited to the specific embodiments discussed above, but only by the following claims and their equivalents.

What is claimed is:

1. A servo compensation system for a disk storage system wherein the disk storage system uses a servo positioning system to position a head relative to a disk, wherein the disk storage system operates in a seek mode and in a follow mode, wherein the disk storage system experiences error that causes the head to become mis-aligned with the disk, wherein the error comprises multiple spin-frequency harmonic run-out error and other servo position errors, and wherein the error is indicated by a position error signal, the system comprising:

a compensation means for processing a position error signal during the follow mode and generating a compensation signal responsive to the position error signal, wherein the position error signal is comprised of components representative of the multiple spin-frequency harmonic run-out error and the other servo position errors, and wherein the compensation signal is comprised of components that cause the servo positioning system to compensate for the multiple spin-frequency harmonic run-out error and the other servo position errors; and an oscillating means for providing an oscillating signal during the seek mode, wherein the oscillating signal is at multiple harmonics of a spin frequency of the disk, and wherein the oscillating means is incorporated within the compensation means.

2. The system of claim 1 further comprising a position error means that is operationally coupled to the compensation means and that is for processing a position signal and generating the position error signal, wherein the position signal indicates the position of the head relative to the disk.

3. The system of claim 1 further comprising a servo positioning means that is operationally coupled to the compensation means and that is for positioning the head relative to the disk in response to the compensation signal wherein the positioning compensates for the multiple spin-frequency harmonic run-out error and the other servo position errors.

4. The system of claim 1 further comprising a switching means for switching the system between the follow mode and the seek mode.

5. The system of claim 1 where the compensation signal is comprised of components that cause the servo positioning system to eliminate the multiple spin-frequency harmonic run-out error at steady-state.

6. The system of claim 1 wherein the compensation means comprises a single digital filter.

7. The system of claim 6 wherein the digital filter has infinite gain at the multiples of the spin frequency of the disk.

8. The system of claim 6 wherein the digital filter does not initialize in response to a switch-over from the seek mode and the follow mode.

9. The system of claim 6 wherein the digital filter has poles at $z=e^{+j\omega t}$ and $z=e^{-j\omega t}$ and where $\omega$ equals the 2 pi times the spin frequency of the magnetic device.

10. The system of claim 6 wherein the digital filter has zeroes at $z=ae^{+j\omega t}$ and $z=ae^{-j\omega t}$ wherein $\omega$ equals the spin frequency of the magnetic device and wherein a is at least 0.95.

11. The system of claim 6 wherein the digital filter is comprised of a proportional compensation path;

a integral compensation path;

a differential compensation path;

a spin frequency compensation path; and wherein the paths are arranged in parallel.

12. The system of claim 1 wherein the oscillation signal is used as a feed-forward signal in the seek mode to compensate for the multiple spin-frequency harmonic run-out error.

13. The system of claim I wherein the oscillation means generates the oscillation signal in response to the position error signal being set to zero.

14. A servo compensation system for a disk storage system wherein the disk storage system uses a servo positioning system to position a head relative to a disk, wherein the disk storage system operates in a seek mode and in a follow mode, wherein the disk storage system experiences error that causes the head to become mis-aligned with the disk, wherein the error comprises first and second spin-frequency harmonic run-out error and other servo position errors, and wherein the error is indicated by a position error signal, the system comprising:

a compensation means for processing a position error signal during the follow mode and generating a compensation signal responsive to the position error signal, wherein the position error signal is comprised of components representative of the first and second spin-frequency harmonic run-out error and the other servo position errors, and wherein the compensation signal is comprised of components that cause the servo positioning system to compensate for the first and second spin-frequency harmonic run-out error and the other servo position errors; and an oscillating means for providing an oscillating signal during the seek mode, wherein the oscillating signal is at a spin frequency of the disk and at twice the spin frequency of the disk, and wherein the oscillating means is incorporated within the compensation means.

15. The system of claim 14 further comprising a position error means that is operationally coupled to the compensation means and that is for processing a position signal and generating the position error signal, wherein the position signal indicates the position of the head relative to the disk.

16. The system of claim 14 further comprising a servo positioning means that is operationally coupled to the compensation means and that is for positioning the head relative to the disk in response to the compensation signal wherein the positioning compensates for the first and second spin-frequency harmonic run-out error and the other servo position errors.

17. The system of claim 14 further comprising a switching means for switching the system between the follow mode and the seek mode.

18. The system of claim 14 where the compensation signal is comprised of components that cause the servo positioning system to eliminate the first and second spin-frequency harmonic run-out error at steady-state.

19. The system of claim 14 wherein the compensation means comprises a single digital filter.

20. The system of claim 19 wherein the digital filter has infinite gain at the spin frequency of the disk and at twice the spin frequency of the disk.

21. The system of claim 19 wherein the digital filter does not initialize in response to a switch-over from the seek mode and the follow mode.

22. The system of claim 19 wherein the digital filter has poles at $z=e^{+j\omega t}$, $z=e^{-j\omega t}$, $z=e^{+j2\omega t}$, and $z=e^{-j2\omega t}$ and where $\omega$ equals 2 pi times the spin frequency of the magnetic device.

23. The system of claim 19 wherein the digital filter has zeroes at $z=a_1 e^{+j\omega t}$, $z=a_1 e^{-j\omega t}$, $z=a_2 e^{+j2\omega t}$, $z=a_2 e^{-j2\omega t}$ wherein $\omega$ equals the spin frequency of the magnetic device and wherein $a_1$ and $a_2$ are each at least 0.95.

24. The system of claim 19 wherein the digital filter is comprised of a proportional compensation path;

a integral compensation path;

a differential compensation path;

a first spin-frequency harmonic run-out compensation path a second spin-frequency harmonic run-out compensation path; and wherein the paths are arranged in parallel.

25. The system of claim 14 wherein the oscillation signal is used as a feed-forward signal in the seek mode to compensate for the first and second spin-frequency harmonic run-out error.

26. The system of claim 14 where in the oscillation means generates the oscillation signal in response to the position error signal being set to zero.

27. A method for operating a servo compensation system in a disk storage system wherein the disk storage system operates in a seek mode and in a follow mode, wherein the disk storage system experiences error that causes a head to become mis-aligned with a disk, and wherein the error comprises multiple spin-frequency harmonic run-out error and other servo position errors, and wherein a position signal indicates the position of the head relative to the disk, the method comprising:

(a) in a position error detection system, processing the position signal to generate a position error signal wherein the position error signal is comprised of components representative of the multiple spin-frequency harmonic run-out error and the other servo position errors;

(b) providing the position error signal to a digital filter;

(c) in the digital filter, processing the position error signal to generate a compensation signal, wherein the compensation signal is comprised of components that cause the servo positioning system to compensate for the multiple spin-frequency harmonic run-out error and the other servo position errors;

(d) providing the compensation signal to a servo positioning system;

(e) in the servo positioning system, positioning the head relative to the disk in response to the compensation signal, wherein the positioning compensates for the multiple spin-frequency harmonic run-out error and the other servo position errors (f) switching from the follow mode to the seek mode wherein steps (a), (b), (c), (d), and (e), are performed during the follow mode; and (g) in the digital filter, providing an oscillating signal at multiples of a spin frequency of the disk during the seek mode.

28. The method of claim 27 further including setting the position error signal to zero after step (f) and wherein the digital filter generates the oscillation signal in response to the position error signal being set to zero.

29. The method of claim 27 wherein the digital filter does not initialize in response to step (f).

30. The method of claim 27 further comprising using the oscillation signal as a feed-forward signal to compensate for the multiple spin-frequency harmonic run-out error in the seek mode.

* * * * *